US009466207B2

(12) United States Patent
Jang

(10) Patent No.: US 9,466,207 B2
(45) Date of Patent: Oct. 11, 2016

(54) APPARATUS AND METHOD FOR REMOTE CONTROL IN PORTABLE COMMUNICATION SYSTEM

(75) Inventor: Ki-Tae Jang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 2393 days.

(21) Appl. No.: 11/960,378

(22) Filed: Dec. 19, 2007

(65) Prior Publication Data

US 2008/0153476 A1 Jun. 26, 2008

(30) Foreign Application Priority Data

Dec. 26, 2006 (KR) ........................ 10-2006-0133966

(51) Int. Cl.
*H04M 3/00* (2006.01)
*G08C 17/00* (2006.01)

(52) U.S. Cl.
CPC ........... *G08C 17/00* (2013.01); *G08C 2201/30* (2013.01); *G08C 2201/50* (2013.01); *G08C 2201/93* (2013.01)

(58) Field of Classification Search
None
See application file for complete search history.

(56) References Cited

U.S. PATENT DOCUMENTS

| | | | | |
|---|---|---|---|---|
| 5,909,183 | A | 6/1999 | Borgstahl et al. | |
| 6,871,063 | B1 * | 3/2005 | Schiffer | G06F 21/35 455/269 |
| 2003/0080874 | A1 | 5/2003 | Yumoto et al. | |
| 2005/0068151 | A1 | 3/2005 | Ushida | |
| 2005/0259618 | A1 * | 11/2005 | Ahya et al. | 370/331 |
| 2007/0190995 | A1 * | 8/2007 | Wang et al. | 455/419 |
| 2007/0259657 | A1 * | 11/2007 | Cheng | 455/419 |
| 2010/0238046 | A1 * | 9/2010 | Lee | G08C 17/00 340/12.54 |

FOREIGN PATENT DOCUMENTS

| | | |
|---|---|---|
| CN | 1564482 | 1/2005 |
| CN | 1798402 | 7/2006 |
| KR | 1020020090455 | 12/2002 |
| KR | 1020030028040 | 4/2003 |
| KR | 1020040022286 | 3/2004 |
| KR | 1020040023426 | 3/2004 |
| KR | 1020040037795 | 5/2004 |
| KR | 1020060034550 | 4/2006 |
| KR | 100584406 | 5/2006 |
| KR | 1020060070994 | 6/2006 |
| KR | 1020060078831 | 7/2006 |

* cited by examiner

*Primary Examiner* — German J Viana Di Prisco
(74) *Attorney, Agent, or Firm* — The Farrell Law Firm, P.C.

(57) ABSTRACT

Provided are an apparatus and a method for a remote control in a portable communication system. The portable communication system includes a remote-controlling terminal which is connected to a remote-controlled terminal using a message necessary for a remote control function to perform a remote control function; and the remote-controlled terminal which is connected to the remote-controlling terminal and performs an operation according to a request of the remote-controlling terminal.

18 Claims, 6 Drawing Sheets

APPARATUS AND METHOD FOR REMOTE CONTROL IN PORTABLE COMMUNICATION SYSTEM

PRIORITY

This application claims priority under 35 U.S.C. §119 to an application entitled "Apparatus And Method For Remote Control In Portable Communication System" filed in the Korean Intellectual Property Office on Dec. 26, 2006 and assigned Serial No. 2006-133966, the contents of which are incorporated herein by reference.

BACKGROUND OF THE INVENTION

1. Field of the Invention

The present invention relates generally to an apparatus and a method for performing a remote control using a portable terminal, and in particular, to an apparatus and a method for performing an authentication process with a remote-controlled terminal using a portable terminal and a message including authentication information in order to enable a remote control.

2. Description of the Related Art

Portable terminals have recently become necessities by people of all ages. Also, service providers and portable terminal manufacturers have competitively developed products or services which are different from other enterprises.

For example, portable terminals have developed into multimedia devices which provide various services including phonebook, games, short message service, e-mail, morning or wake-up call, Motion Picture Experts Group (MPEG) Layer 3 (MP3), schedule management function, digital camera and wireless Internet services.

The above-mentioned functions enable a user of the portable terminal to directly manipulate functions of the portable terminal through a keypad. In other words, if the user of the portable terminal desires to power down the portable terminal, the user must directly select and execute an "End" key button on the keypad of the portable terminal.

However, the user of the portable terminal may not always carry the portable terminal. For example, if the portable terminal is left alone for a long time, a caller may not be able to communicate with the user of the portable terminal on urgent business.

Accordingly, there is required an apparatus and a method for remote-controlling a portable terminal which is not carried by a user.

SUMMARY OF THE INVENTION

An aspect of the present invention is to substantially solve at least the above problems and/or disadvantages and to provide at least the advantages below. Accordingly, an aspect of the present invention is to provide an apparatus and a method for using a remote control function in a portable communication system.

Another aspect of the present invention is to provide an apparatus and a method for generating or reading a message necessary for a remote control in a remote-controlling terminal in order to use a remote control function in a portable communication system.

A further aspect of the present invention is to provide an apparatus and a method for generating or reading a message necessary for a remote control in a remote-controlled terminal in order to use a remote control function in a portable communication system.

The above aspects are achieved by providing a point-to-point emulation apparatus and method in a broadband wireless communication system.

According to one aspect of the present invention, there is provided a portable communication system enabling a remote control, including a remote-controlling terminal which is connected to a remote-controlled terminal using a message necessary for a remote control function to perform the remote control function; and the remote-controlled terminal which is connected to the remote-controlling terminal and performs an operation according to a request of the remote-controlling terminal.

According to another aspect of the present invention, there is provided a method of performing a remote control request in a portable terminal, including if a performance of a remote control function is requested, generating a remote control request message for requesting the remote control function of a remote-controlled terminal and transmitting the remote control request message to the remote-controlled terminal; and if a response message to the remote control request message is received from the remote-controlled terminal, generating a remote control message including a remote control command to perform the remote control function and transmitting the remote control message to the remote-controlled terminal.

According to a further aspect of the present invention, there is provided a method of performing a remote control function in a remote-controlled terminal, which has received a remote control request message, including if the remote control request message is received from a remote-controlling terminal, reading the remote control request message to check a remote control item the remote-controlling terminal desires to control; checking a setup state of the checked remote control item to generate a response message to the remote control request message and transmitting the response message to the remote-controlling terminal; and if a remote control message is received from the remote-controlling terminal, checking a remote control command included in the remote control message to perform an operation corresponding to the remote control command.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and a method for enabling a remote control in a portable communication system.

The apparatus preferably includes a remote-controlling terminal which transmits and/or receives a message and a remote-controlled terminal. The remote-controlling terminal and the remote-controlled terminal may have the same structure.

Also, the message may include a Short Message Service (SMS) message, an e-mail, a Multimedia Message Service (MMS) message, etc.

Figure 1:
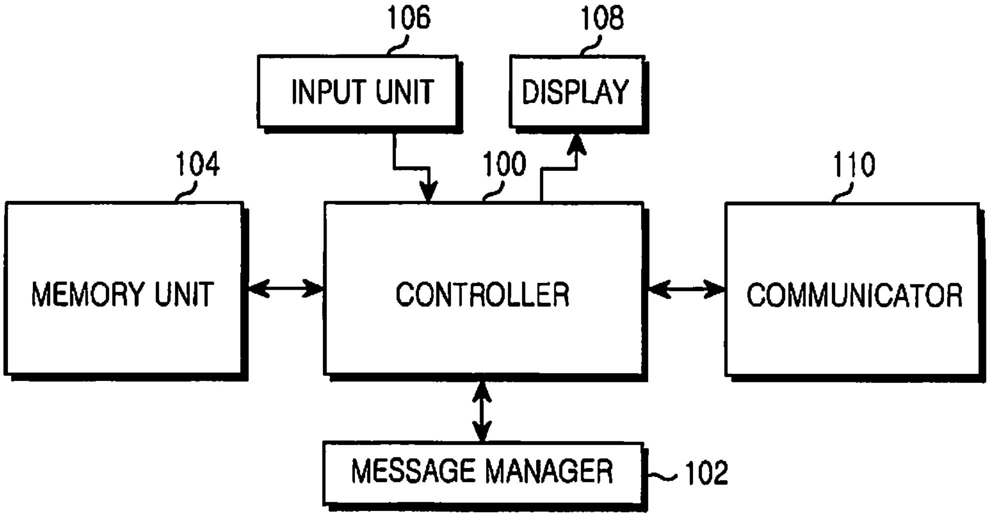
FIG. 1 is a block diagram of a portable terminal providing a remote control function according to the present invention.

FIG. 1 is a block diagram of a portable terminal providing a remote control function according to the present invention. Hereinafter, examples of the portable terminal may include portable communication terminals such as a cellular phone, a Personal Communication System (PCS) terminal, a Personal Data Assistant (PDA), an International Mobile Telecommunication-2000 (IMT-2000) terminal, and a fourth generation (4G) broadband system. Also, the portable terminal will be described with general structures of the above-mentioned examples.

Referring to FIG. 1, the portable terminal includes a controller 100, a message manager 102, a memory unit 104, an input unit 106, a display 108, and a communicator 110.

The controller 100 controls an overall operation of the portable terminal. For example, the controller 100 performs processing and controlling for voice and data communications. According to the present invention, besides the normal processing and controlling function, if execution of a remote control function is requested, the controller 100 may instruct the message manager 102 to generate a message to be transmitted to a portable terminal, which is to be remote-controlled, i.e., a remote-controlled terminal, and read a message received from the remote-controlled terminal.

The controller 100 also performs an operation corresponding to a remote control command which is checked through reading of the message manager 102.

The message manager 102 is instructed by the controller 100 to generate the message to be transmitted to the remote-controlled terminal, read the message received from the remote-controlled terminal, and provide the read message to the controller 100.

The memory unit 104 includes a read only memory (ROM), a random access memory (RAM), and a flash ROM. The ROM stores micro-codes of a program for processing and controlling operations of the controller 100 and the message manager 102 and various types of reference data.

The RAM is a working memory of the controller 100 and stores temporary data which is generated during execution of various programs. The flash ROM stores various updatable types of storage data including a phonebook, a transmitted message, a received message, etc.

The input unit 106 includes a plurality of function keys including numerical key buttons from “0” to “9,” a menu button, a cancel (delete) button, a confirm button, a talk button, an end button, an Internet access button, navigation key (or direction key) buttons, character input key buttons, etc. The input unit 106 also provides the controller 100 with key input data (e.g., a request for an execution of a remote control function) corresponding to a key pressed by a user.

The display 108 displays state information, limited numeral characters, a plurality of moving pictures, a plurality of still pictures, etc. which are generated during the operation of the portable terminal. The display 108 may be a color liquid crystal display (LCD).

The communicator 110 transmits and/or receives a radio frequency (RF) signal of data which is input and output through an antenna (not shown). For example, if the communicator 110 transmits the RF signal, the communicator 110 performs channel coding and spreading on data to be transmitted and up converts the RF signal in order to transmit the data. If the communicator 110 receives the RF signal, the communicator 110 transforms the RF signal into a baseband signal and performs de-spreading and channel decoding on the baseband signal in order to recover the data.

The controller 100 may operate as the message manager 102. However, in the present invention, the controller 100 and the message manager 102 are separately illustrated so as to separately describe their functions. Thus, if the portable terminal is substantially realized, the controller 100 may also process the function of the message manager 102.

An apparatus of the portable terminal enabling a remote control function has been described. A method of generating a message for using a remote control function to perform the remote control function using the apparatus will now be described.

Figure 2:
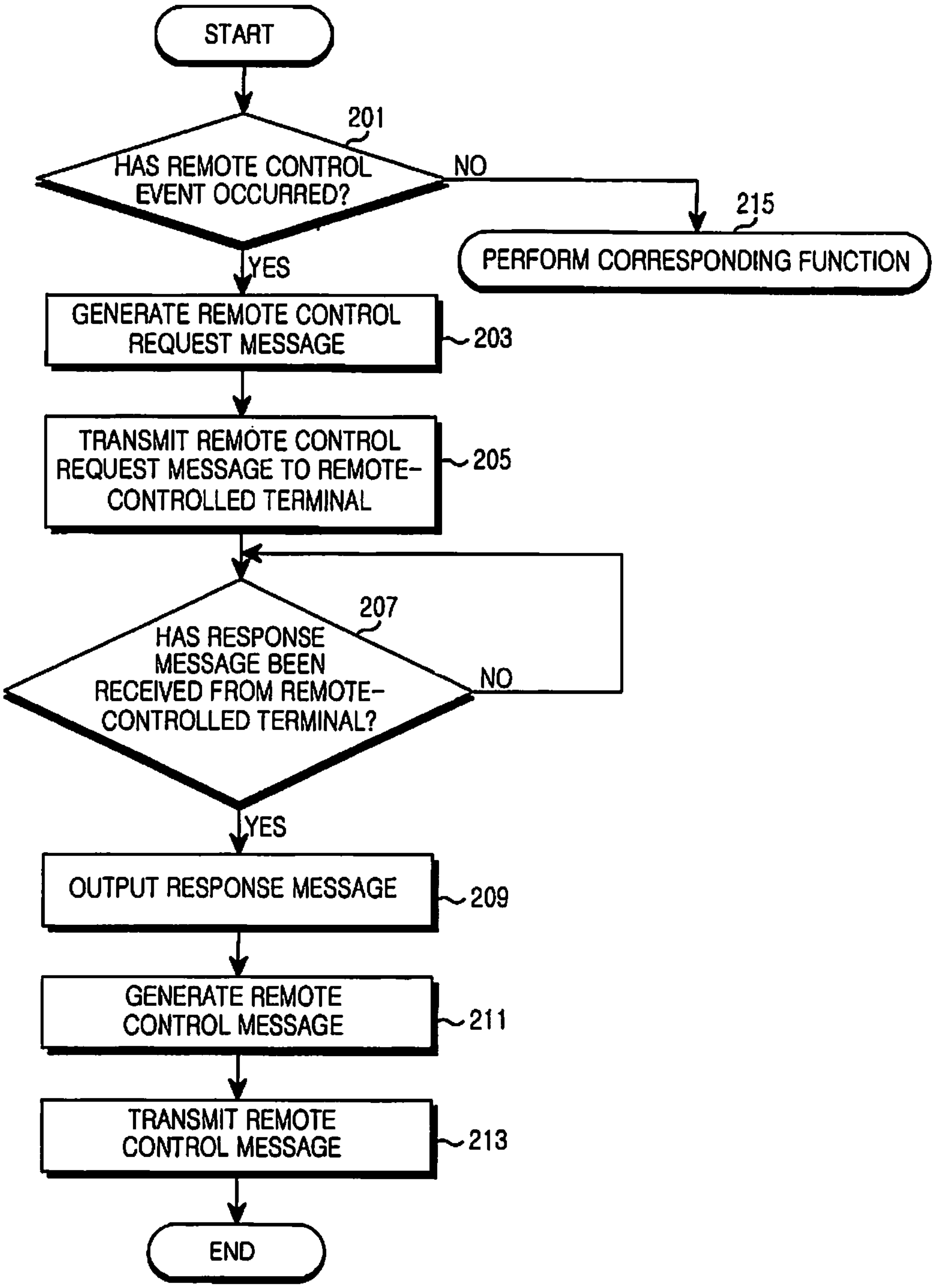
FIG. 2 is a flowchart of a process of performing a remote control function in a portable terminal according to the present invention.
Figure 6A:
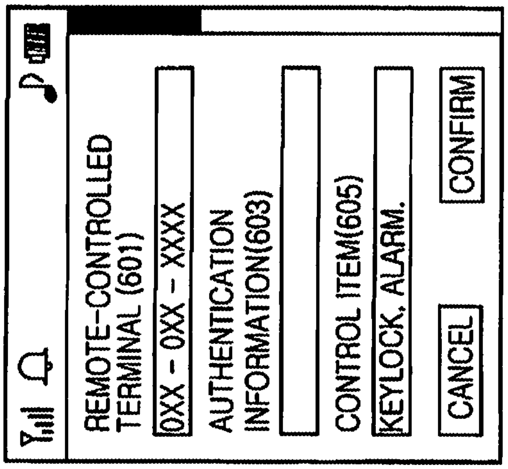
FIGS. 6A and 6B illustrate screens of a portable terminal performing a remote control function according to the present invention.
Figure 6B:
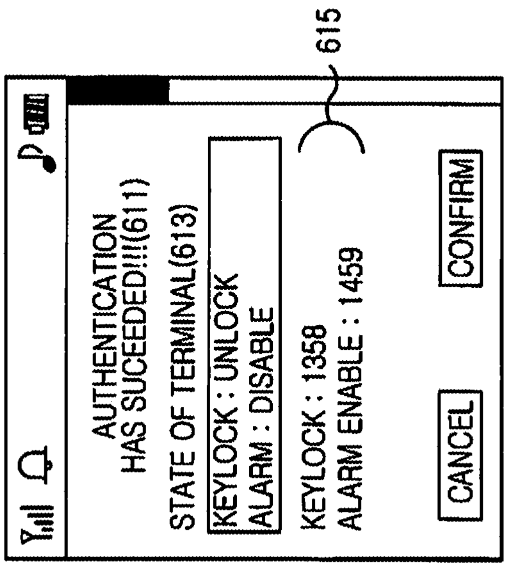

FIG. 2 is a flowchart of a process of performing a remote control function in a portable terminal according to the present invention. FIGS. 6A and 6B illustrate a screen of a portable terminal performing a remote control function according to the present invention.

Referring to FIG. 2, in step 201, the controller 100 of the portable terminal determines whether an event for controlling a remote-controlled terminal has occurred by a user. If it is determined in step 201 that the event has not occurred, the controller 100 goes to step 215 to perform a corresponding function, e.g., a standby mode.

If it is determined in step 201 that the event has occurred, the controller 100 proceeds to step 203 to instruct the message manager 102 to generate a remote control request message.

Here, the remote control request message may be a message for requesting the remote control function of the remote-controlled terminal and includes information of the remote-controlled terminal, authentication information necessary for performing an authentication process with the remote-controlled terminal, and at least one item necessary for inputting a remote control command to control the remote-controlled terminal.

For example, if the user of the portable terminal desires to control setup states of a key lock and an alarm of the remote-controlled terminal, the message manager 102 may generate the remote control request message through inputs as shown in FIG. 6A.

In step 205, the controller 100 transmits the remote control request message to the remote-controlled terminal. In step 207, the controller 100 determines whether a response message to the remote control request message has been received from the remote-controlled terminal.

If it is determined in step 207 that the response message has not been received from the remote-controlled terminal, the controller 100 re-performs step 207.

If it is determined in step 207 that the response message has been received from the remote-controlled terminal, the controller 100 proceeds to step 209 to instruct the message manager 102 so as to read the response message. The controller 100 outputs the response message read by the message manager 102 to the display 108.

Here, the response message output from the controller 100 may include information indicating a setup state of a function the portable terminal desires to control. The response message may also include a result of the authentication process which is performed between the portable terminal and the remote-controlled terminal.

For example, as shown in FIG. 6B, the response message may include information 611 indicating whether authentication has been successfully performed, a state 613 of a remote-controlled terminal, a method 615 of remote-controlling the remote-controlled terminal, etc.

In other words, the key lock of the remote-controlled terminal is unlocked, and the alarm is disabled.

The method 615 sets the key lock and includes an order of requesting the remote control function. In other words, "1358", a method of setting the key lock, enumerates an order (e.g., "1") of requesting the remote control function and a method (e.g., "358") of setting the key lock.

The portable terminal may use a message including a remote control command "358," which to enable the key lock, so as to set the key lock.

In step 211, the controller 100 instructs the message manager 102 to generate a remote control message. Here, the remote control message refers to a message which includes a remote control command used by the user of the portable terminal to control the remote-controlled terminal.

In step 213, the controller 100 transmits the remote control message to the remote-controlled terminal and then ends the present process.

It has been described with reference to FIG. 2 that the remote-controlled terminal receives the remote control request message from the portable terminal capable of transmitting and/or receiving a message. However, the remote control function may be performed in a portable terminal which enables only voice communications.

A remote control method using the portable terminal enabling only the voice communications will be described in detail later with reference to FIG. 5.

Figure 3:
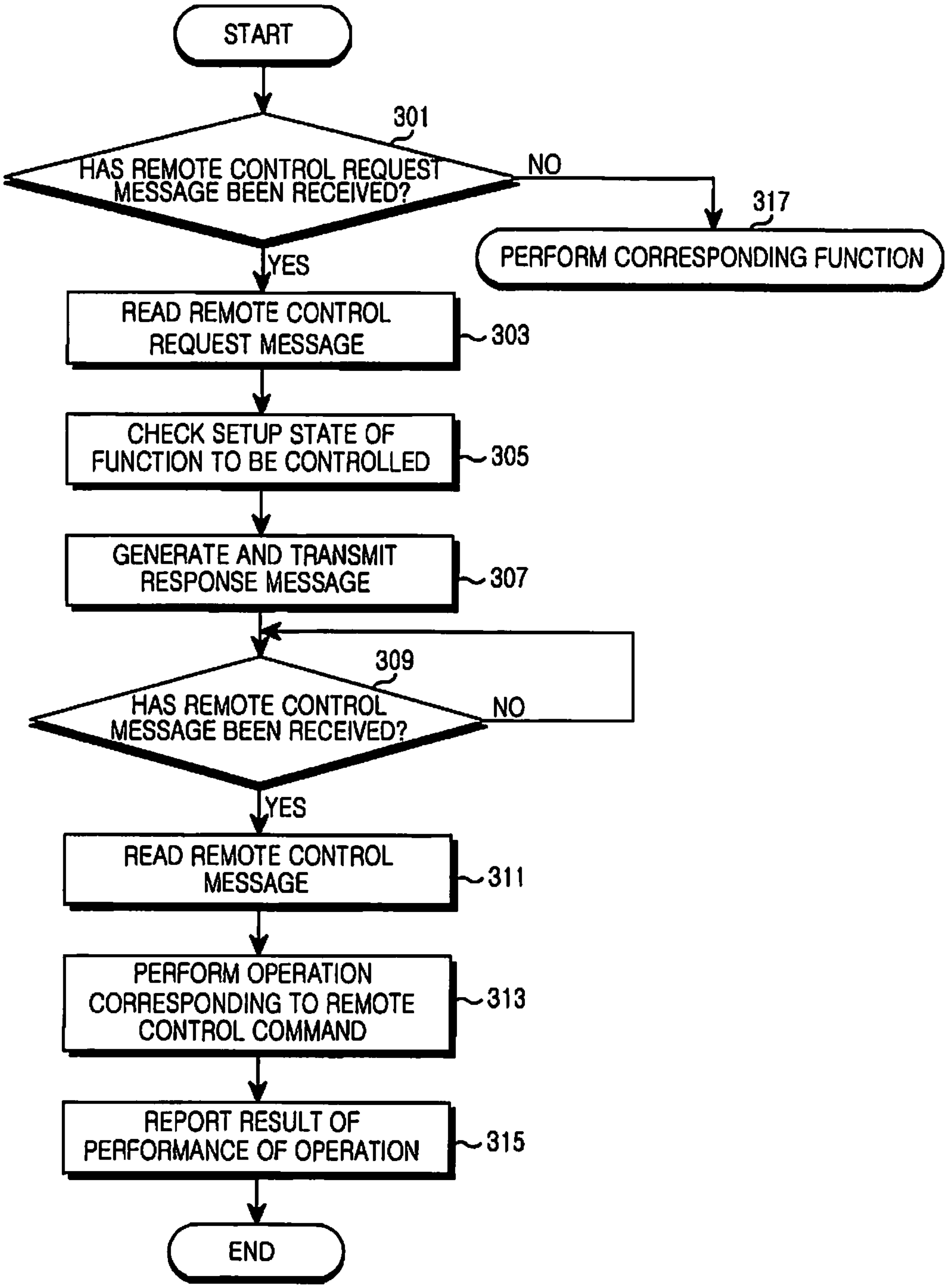
FIG. 3 is a flowchart of a process of performing a remote control function in a remote-controlled terminal according to the present invention.

FIG. 3 is a flowchart of a process of performing a remote control function in a remote-controlled terminal according to the present invention.

Referring to FIG. 3, in step 301, the remote-controlled terminal determines whether a remote control request message has been received. If it is determined in step 301 that the remote control request message has not been received, the remote-controlled terminal goes to step 317 to perform a corresponding function, e.g., a standby mode.

If it is determined in step 301 that the remote control request message has been received, the remote-controlled terminal proceeds to step 303 to read the remote control request message. In step 305, the remote-controlled terminal checks a setup state of a function a transmitting portable terminal desires to control, wherein the transmitting portable terminal has transmitted the remote control request message.

Here, step 303 includes a sub-step of checking authentication information included in the remote control request message and a sub-step of reading an item the transmitting portable terminal desires to control.

In step 307, the remote-controlled terminal generates a response message to the remote control request message and transmits the response message to the transmitting portable terminal which has transmitted the remote control request message.

In step 309, the remote-controlled terminal determines whether a remote control message has been received from the transmitting portable terminal which has transmitted the remote control request message. Here, the remote control message is a message which includes a remote control command to the transmitting portable terminal to control the remote-controlled terminal.

If it is determined in step 309 that the remote control message has not been received from the transmitting portable terminal, the remote-controlled terminal re-performs step 309.

If it is determined in step 309 that the message has been received, the remote-controlled terminal proceeds to step 311 to read the remote control message so as to check the remote control command included in the remote control message. In step 313, the remote-controlled terminal performs an operation corresponding to the checked remote control command.

In step 315, the remote-controlled terminal transmits to the transmitting portable terminal a message for reporting a result of the performance of the operation corresponding to the remote control command. The remote-controlled terminal ends the present process.

Figure 4:
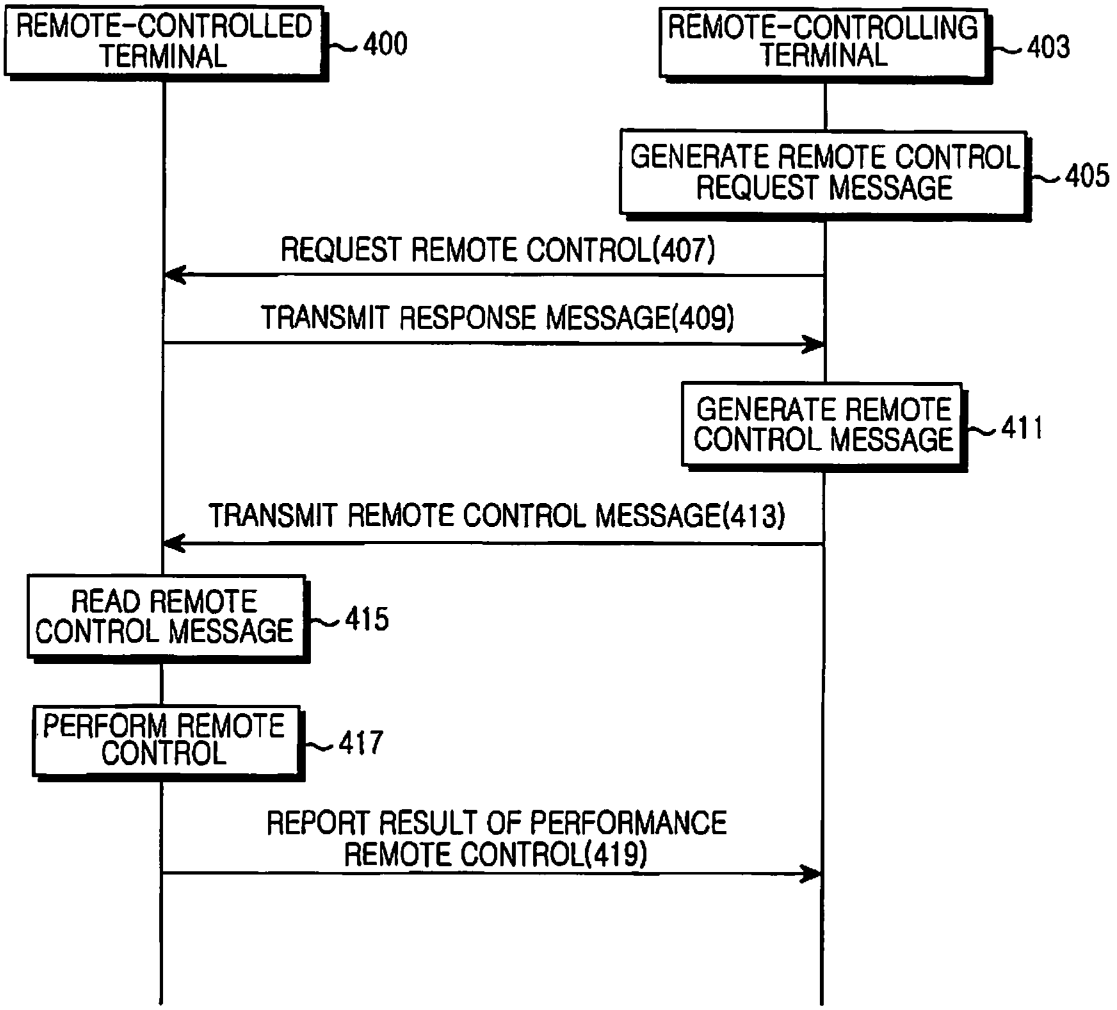
FIG. 4 is a flowchart of a remote control system according to the present invention.

FIG. 4 is a flowchart of a remote control system according to the present invention.

Referring to FIG. 4, the remote control system includes a remote-controlling terminal 403 and a remote-controlled terminal 400. The remote-controlling terminal 403 refers to a communication terminal which is capable of transmitting and/or receiving a message, e.g., a Short Message Service (SMS) message, a Multimedia Message Service (MMS) message, etc.

In step 405, the remote-controlling terminal 403, which desires to perform a remote control, generates a remote control request message. In step 407, the remote-controlling terminal 403 transmits the remote control request message to the remote-controlled terminal 400.

In step 409, the remote-controlled terminal 400 generates a response message to the remote control message and transmits the response message to the remote-controlling terminal 403.

In step 411, the remote-controlling terminal 403 generates a remote control message, and in step 413 transmits the remote control message to the remote-controlled terminal 400. Here, the remote control message includes a remote control command necessary for controlling the remote-controlled terminal 400.

In step 415, the remote-controlled terminal 400 reads the remote control message to check the remote control command. In step 417, the remote-controlled terminal 400 performs an operation corresponding to the remote control command.

In step 419, the remote-controlled terminal 400 transmits a message for reporting a result of the performance of the operation to the remote-controlling terminal 403.

Figure 5:
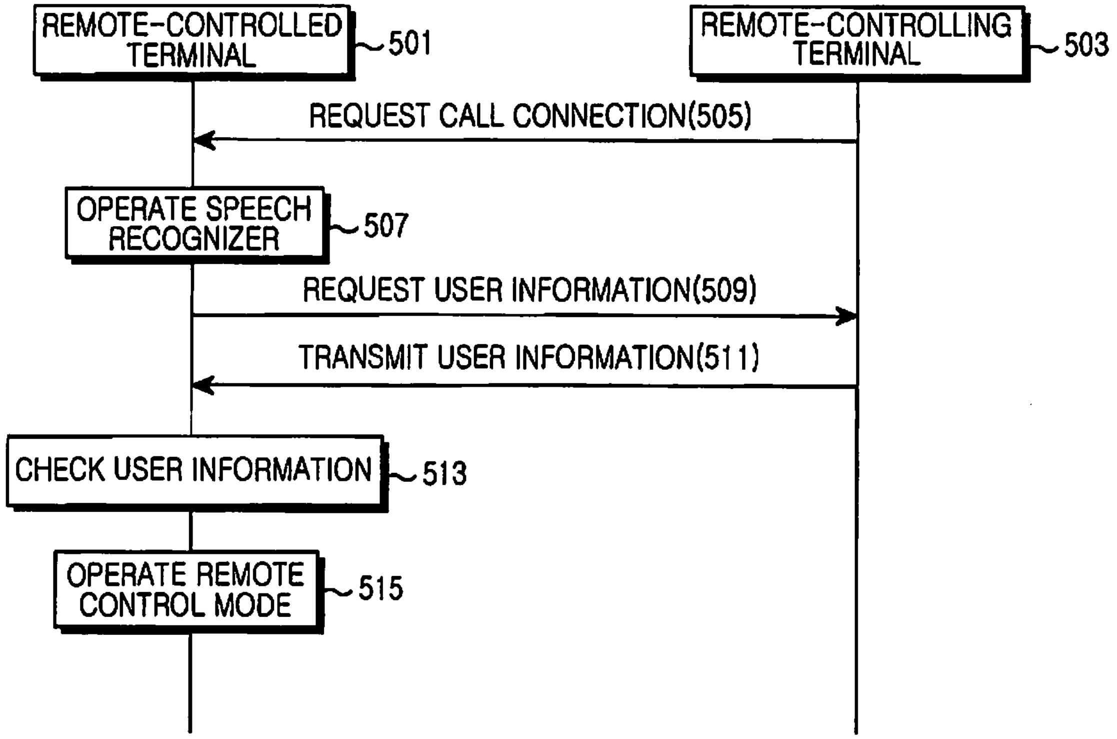
FIG. 5 is a flowchart of a remote control system according to the present invention.

FIG. 5 is a flowchart of a remote control system according to the present invention.

Referring to FIG. 5, the remote control system includes a remote-controlling terminal 503 and a remote-controlled terminal 501. The remote-controlling terminal 503 refers to a communication terminal capable of performing only voice communications.

In step 505, the remote-controlling terminal 503 requests a call connection of the remote-controlled terminal 501 in order to perform a remote control function.

In step 507, the remote-controlled terminal 501 operates a speech recognizer. In step 509, the remote-controlled terminal 501 requests user information of the remote-controlling terminal 503 to check whether the remote-controlling terminal 503 is allowed to use the remote control function.

In step 511, the remote-controlling terminal 503 transmits the user information, i.e., a voice input of a user, to the remote-controlled terminal 501.

For example, if the remote-controlling terminal 503 requests a remote control of the remote-controlled terminal 501, the remote-controlled terminal 501 performs an answer back function to request authentication information of the remote-controlling terminal 503 using, for example, an "Input Authentication Information" message.

The remote-controlling terminal 503 inputs a message for performing an authentication process to perform the authentication process.

In step 513, the terminal 501 checks the user information of the remote-controlling terminal 503 to determine whether the remote-controlling terminal 503 is allowed to perform the remote control function. If the remote-controlling terminal 503 is allowed to perform the remote control function, in step 515, the remote-controlled terminal 501 operates a remote control mode.

In accordance with the present invention as described above, a remote-controlling terminal can be connected to a remote-controlled terminal using a message function so as to control the remote-controlled terminal.

Also, a remote control function can be performed using a message which is transmitted and received between the remote-controlled terminal and the remote-controlling terminal. As a result, the remote control function can be applied to standard terminals and other types of terminals.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of performing a remote control request in a portable terminal, the method comprising:
- generating a remote control request message for requesting a remote control function of a remote-controlled terminal, the remote control request message including at least one item of the remote-controlled terminal to be controlled remotely;
- transmitting the remote control request message to the remote-controlled terminal;
- receiving, from the remote-controlled terminal, a response message to the remote control request message, the response message including at least one remote control command for controlling the at least one item and at least one state information for the at least one item;
- generating a remote control message including the at least one remote control command to perform the at least one item; and
- transmitting the remote control message to the remote-controlled terminal.

2. The method of claim 1, wherein the remote control request message further includes at least one of information on the remote-controlled terminal, and authentication information of the remote-controlled terminal.

3. The method of claim 1, wherein generating the remote control request message comprises:
- receiving, from a user, an input of the at least one item of the remote-controlled terminal to be control remotely; and
- generating the remote control request message including the input at least one item.

4. The method of claim 1, wherein generating the remote control message comprises:
- displaying the at least one item and the at least one state information of the at least one item based on the response message; and
- generating the remote control message in response to a user request.

5. The method of claim 1, wherein the response message further includes at least one of information indicating whether authentication has been successfully performed, an order of requesting the remote control function, and a method of controlling the remote control function.

6. A method of performing a remote control function in a remote-controlled terminal, the method comprising:
- receiving a remote control request message from a remote-controlling terminal, the remote control request message including at least one item of the remote-controlled terminal to be controlled remotely;
- identifying the at least one item that the remote-controlling terminal desires to control, based on the remote control request message;
- generating a response message to the remote control request message, the response message including a remote control command for controlling the at least one item and at least one state information for the at least one item;
- transmitting the response message to the remote-controlling terminal;
- receiving, from the remote-controlling terminal, a remote control message including the remote control command to control the at least one item, in response to the response message;
- identifying the remote control command included in the remote control message; and
- performing an operation corresponding to the remote control command.

7. The method of claim 6, further comprising transmitting, to the remote-controlling terminal, a result of performing the operation.

8. The method of claim 6, wherein the response message further includes at least one of information indicating whether authentication has been successfully performed, an order of requesting the remote control function, and a method of controlling the remote control function.

9. The method of claim 6, further comprising:
- if the remote-controlling terminal is capable of performing voice communications, performing an authentication process with the remote-controlling terminal using the voice communications.

10. A portable terminal for performing a remote control request, the portable terminal comprising:
- a memory; and
- a controller configured to:
  - generate a remote control request message for requesting a remote control function of a remote-controlled terminal, the remote control request message including at least one item of the remote-controlled terminal to be controlled remotely,
  - transmit the remote control request message to the remote-controlled terminal,
  - receive, from the remote-controlled terminal, a response message to the remote control request message, the response message including at least one remote control command for controlling the at least one item and at least one state information for the at least one item, generate a remote control message including the at least one remote control command to perform the at least one item, and transmit the remote control message to the remote-controlled terminal.

11. The portable terminal of claim 10, wherein the remote control request message further includes at least one of information on the remote-controlled terminal, and authentication information of the remote-controlled terminal.

12. The portable terminal of claim 10, wherein the controller is further configured to receive, from a user, an input of the at least one item of the remote-controlled terminal to be control remotely, and to generate the remote control request message including the input at least one item.

13. The portable terminal of claim 10, wherein the controller is further configured to display the at least one item and the at least one state information of the at least one item based on the response message, and to generate the remote control message in response to a user request.

14. The portable terminal of claim 10, wherein the response message further includes at least one of information indicating whether authentication has been successfully performed, an order of requesting the remote control function, and a method of controlling the remote control function.

15. A portable terminal for performing a remote control request, the portable terminal comprising:

a memory; and a controller configured to:

receive a remote control request message from a remote-controlling terminal, the remote control request message including at least one item of the remote-controlled terminal to be controlled remotely, identify a remote control item that the remote-controlling terminal desires to control, based on the remote control request message, generate a response message to the remote control request message, the response message including a remote control command for controlling the at least one item and at least one state information for the at least one item, transmit the response message to the remote-controlling terminal, receive, from the remote-controlling terminal, a remote control message including the remote control command to control the at least one item, in response to the response message, identify the remote control command included in the remote control message, and perform an operation corresponding to the remote control command.

16. The portable terminal of claim 15, wherein the controller is further configured to transmit a result of performing the operation to the remote-controlling terminal.

17. The portable terminal of claim 15, wherein the response message further includes at least one of information indicating whether authentication has been successfully performed, an order of requesting the remote control function, and a method of controlling the remote control function.

18. The portable terminal of claim 15, wherein the controller is further configured to perform an authentication process with the remote-controlling terminal using voice communications if the remote-controlling terminal is capable of performing the voice communications.

* * * * *